United States Patent [19]

Thompson

[11] Patent Number: 4,759,243

[45] Date of Patent: Jul. 26, 1988

[54] METHOD AND APPARATUS FOR OPTIMIZING SINGLE POINT MACHINING OPERATIONS

[75] Inventor: Robert A. Thompson, New York, N.Y.

[73] Assignee: General Electric Company, Schenectady, N.Y.

[21] Appl. No.: 944,484

[22] Filed: Dec. 19, 1986

[51] Int. Cl.$^4$ .............................................. B23B 3/00
[52] U.S. Cl. ....................................... 82/1 C; 82/2 B; 82/DIG. 9
[58] Field of Search ................... 82/1 C, 2 B, DIG. 9; 364/474

[56] References Cited

U.S. PATENT DOCUMENTS

| | | | |
|---|---|---|---|
| 3,504,581 | 4/1970 | Weichbrodt et al. | 82/1 |
| 3,548,648 | 12/1970 | Weichbrodt et al. | 73/104 |
| 3,550,107 | 12/1970 | Thompson et al. | 340/267 |
| 3,604,834 | 8/1986 | Thompson | 51/165 |

OTHER PUBLICATIONS

R. A. Thompson, "A General Theory for Regenerative Stability" Proc. 8th North American Manufacturing Research Conference (NAMRC), SME, May 18-21, 198, Univ. of Missouri, Rolla, MO, pp. 377-387.

Primary Examiner—Frederick R. Schmidt
Assistant Examiner—Robert Showalter
Attorney, Agent, or Firm—Donald R. Campbell; James C. Davis, Jr.; Paul R. Webb, II

[57] ABSTRACT

In a single point machining operation, such as metal cutting on a lathe, the precession angle of lobes on a rotating workpiece is determined by measuring the frequency and changing phase of the cutting vibrations, and the stability of the machining operation is monitored by comparing the lobe precession angle to a predetermined range of values within which regenerative chatter may occur. Stability of the machining operation is maintained and productivity is optimized by controlling the crossfeed to maintain the lobe precession angle close to but outside of the predetermined range of values.

9 Claims, 3 Drawing Sheets

FIG. 1

FIG. 2A  $\Omega T$

FIG. 2B  $\omega (1/sec)$

FIG. 2C  $\alpha (1/sec)$

FIG. 2D  $q$

FIG. 2E  $z$ ———
$\dfrac{aK_R}{2}$ ········

METHOD AND APPARATUS FOR OPTIMIZING SINGLE POINT MACHINING OPERATIONS

BACKGROUND OF THE INVENTION

This invention relates generally to the control of machine tools and the like, and more particularly to a method and apparatus for monitoring and controlling a single point machining operation to optimize productivity.

A significant limiting factor on productivity in single point machining operations, such as metal cutting using a lathe, is regenerative instability, which is a major source of chatter in machine tools. Regeneration is the phenomenon whereby past events are fed back with a time delay to drive a system at a later time. Regenerative vibrations often occur in a machine tool when the cutting tool passes over a previously machined area, and are caused by variations in depth of cut and chip thickness due to the normal relative vibrations between the tool and the workpiece. During the single point machining of a rotating workpiece, lobes or waves are formed on the workpiece as a result of these normal vibrations. Lobes move relative to the workpiece during machining, i.e., regenerate, whereby a workpiece lobe which is cut by the tool on one revolution is fed back and drives the tool during the next revolution. If in this process the lobe grows and gets larger, the system is regeneratively unstable; if the lobe gets smaller, the system is regeneratively stable. The regeneration of the lobes causes oscillatory vibrations and chatter, which lead to unacceptable scalloping of the workpiece surface, accelerated tool wear and breakage, and may cause damage to the machine tool.

Regenerative chatter greatly limits the productivity of machine tools. The mechanisms which govern regenerative chatter are not well understood, and this has hampered the development of adaptive control strategies which are effective for minimizing chatter and optimizing cutting and productivity. Because of the dynamic nature of the machining process, it is not possible to establish fixed operating conditions which insure both that the process remains stable and that productivity is optimized. In most cases, regenerative chatter is caused by workpiece flexibility so that modifications to the machine tool structure are ineffective for controlling chatter. In order to maintain optimum cutting and productivity, it is necessary to monitor the machining process and adaptively control its operating conditions. Optimum cutting and productivity can best be obtained by sensing the state of stability of the process and, through suitable controls, by adjusting the machining conditions to maintain optimal control. This in turn requires a better understanding of the dynamic and complex nature of regenerative chatter and of mechanisms which influence chatter so that appropriate stability sensors and an appropriate control strategy can be employed.

It is desirable to provide a method and an apparatus for dynamically monitoring and controlling a single point machining operation to minimize chatter and to optimize the machining operation, and it is to these ends that the present invention is directed.

SUMMARY OF THE INVENTION

The invention affords highly advantageous methods and apparatus for optimizing a single point machining operation, as, for example, a metal machining process using a lathe. It is based upon the discovery that the lobe or wave precession effect is an accurate and effective way of determining the state of stability of a single point machining operation and is the best discriminate of chatter. The invention employs the lobe precession effect, combined with an understanding of the phenomena and mechanisms which affect chatter, to afford a highly effective adaptive control strategy for establishing cutting conditions which optimize productivity and for modifying the cutting conditions when chatter is imminent. More particularly, the invention affords a method and apparatus for simply and accurately determining the lobe precession angle per revolution to enable monitoring of the state of stability of the machining operation, and for controlling the relative movement between the cutting tool and the workpiece to avoid regenerative instability while optimizing the machining operation.

Briefly, stated, in one aspect, the invention provides a method and apparatus for optimizing a single point machining operation where a cutting tool engages a rotating workpiece and the tool and the workpiece are moved relative to one another to machine the workpiece, wherein a lobe precession parameter which is representative of the precession of lobes about the workpiece is determined and compared with a predetermined range of values within which regenerative chatter occurs, and the relative movement between the tool and workpiece in a direction parallel to the axis of rotation is controlled so as to maintain the lobe precession outside of the predetermined range of values to prevent the occurrence of regenerative chatter.

In another aspect, the invention affords a method and an apparatus wherein the vibrations produced by the machining operation are sensed and converted to a corresponding electrical signal. Over successive revolutions of the workpiece, the change in the angle at which the electrical signal reaches a predetermined magnitude relative to a predetermined angular position of the workpiece is determined, and the relative movement between the tool and the workpiece is controlled so as to maintain the change in angle outside of a predetermined range of values.

More specifically, the instability of a single point machining operation is closely related to the lobe precession angle per revolution. This precession angle changes rapidly with the state of stability, and, as such, affords a particularly convenient way of monitoring the stability of the machining operation. In accordance with the invention, the lobe precession angle per revolution is determined by referencing the cutting vibrations produced during the machining operation to the rotation of the machine spindle, and by detecting the changing phase of the vibrations between successive revolutions of the workpiece. It has been found that maximum instability occurs when the lobe precession angle per revolution has a value of the order of $\pi/2$ radians, since at this phase shift the maximum amount of energy is transferred from the lobe interaction into the machine. Moreover, it has been found that it is possible, for a given machining operation, to define a range of lobe precession values about the value at which maximum instability occurs within which the machining operation is regeneratively unstable and outside of which the operation is regeneratively stable. This affords a particularly convenient basis for an adaptive control strategy for maintaining the machining operation within a stable state and for optimizing productivity. It has been found that the lobe precession angle can be controlled by controlling the cutting compliance through adjustment of the relative movement between the cutting tool and the workpiece, which may be conveniently accomplished by controlling the crossfeed rate. Accordingly, by adjusting the crossfeed or width of the chip cut at each point along the cut so as to remain just shy of the range of lobe precession angles at which chatter occurs, the machining rate may be optimized while the machining operation may be maintained within a stable operating zone. The manner in which this is accomplished will be described more fully hereinafter.

DESCRIPTION OF THE PREFERRED EMBODIMENT

The invention is particularly well adapted to monitoring and controlling a single point machining operation, such as the machining of metal parts using a lathe, in which a cutting tool engages a rotating workpiece and the tool and workpiece are moved relative to one another to machine the workpiece, and will be described in the context. As will become apparent, however, the principles of the invention are applicable to other types of single point machining operations.

Prior to describing the invention, it is appropriate to first consider its underlying principles since these will facilitate a better understanding of the invention from the description which follows. This invention is related to the invention disclosed and claimed in the inventor's commonly assigned U.S. Pat. No. 4,604,834 and is based upon the inventor's development of a theory of regenerative stability which explains the mechanisms which govern regenerative stability. This theory is presented in a publication by R. A. Thompson entitled "A General Theory for Regenerative Stability", *Proc. 8th North American Manufacturing Research Conference (NAMRC)*, May 18-21, 1980, Univ. of Missouri, Rolla, MO., pp. 377-387. The patent and publication are incorporated by reference herein.

As described in the publication, an analysis of a singly regenerative system, which is typical of lathes, begins with the assumption that the dynamic regenerative normal cutting force $F_d$ is of the form $$F_d = F_o e^{\alpha t} \sin \omega t \qquad (1)$$

where $F_o$ is the initial force or noise in the system and $\alpha$ is the exponential growth index which determines the growth or decay of oscillations such that when $\alpha < 0$ the system is stable and regenerative vibrations decay exponentially with time; when $\alpha = 0$, the system is quasi-stable; and when $\alpha > 0$, the system is unstable and chatter develops and grows exponentially with time.

Following the procedure outlined in the above publication, the exponential growth index, $\alpha$, is described in terms of the machine and cutting process characteristics by writing the basic differential and time-delayed governing equations for the regenerative cutting process, substituting the force law of equation (1) into them so as to reduce them to four algebraic transcendental equations, and then defining several non-dimensional parameters, e.g., q, the cutting quotient and z, the cutting stability index, which lead to their solution. Appendix A presents the equations which characterize single point machining regenerative stability in terms of three basic machine parameters, i.e., the effective mass, m, the damping coefficient, c, and the static stiffness of the workpiece relative to the tool, $k_s$, and in terms of three fundamental parameters which characterize the process, i.e., the workpiece rotational period, T, the cutting compliance or depth-of-cut per unit normal cutting force, $K_w$, and the overlap factor, $\mu$. Appendix B gives a computer program which may be employed for solving these equations. Equation (A5) introduces the number of lobes or workpiece undulations into the theory of regeneration, and sets forth that the chatter frequency, $\omega$, is the lobe passing frequency, $2\pi nN$, where n is the number of lobes and $N = 1/T$ is the rotational speed, plus the lobe precession rate $\Omega$.

Figure 1:
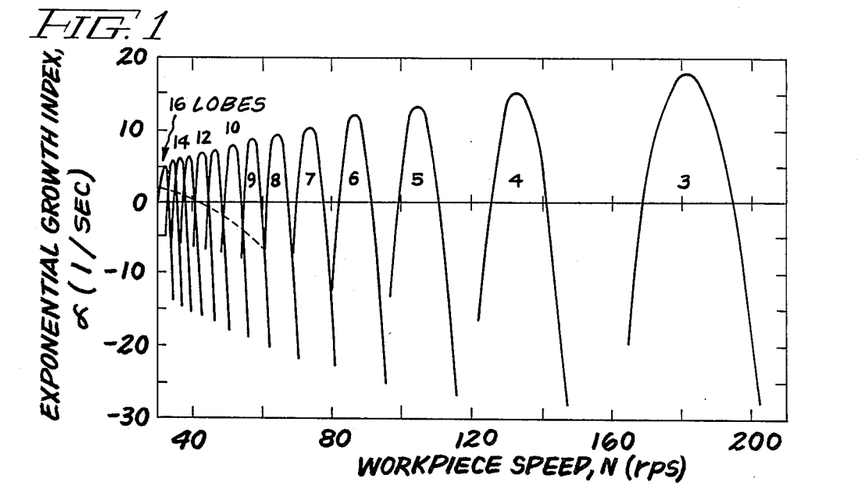
FIG. 1 is a plot which illustrates the variation in exponential growth index with workpiece speed for a particular machining operation and for 3-16 workpiece lobes.
Figure 2A:
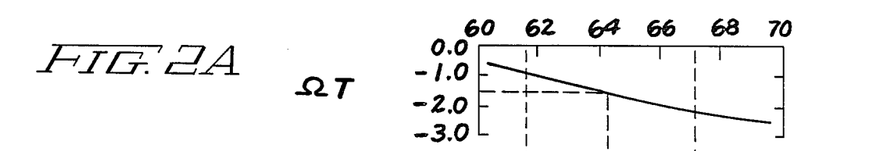
FIGS. 2A-E illustrate the variations in significant regenerative parameters with workpiece speed for the machining operation of FIG. 1 and for eight lobes.
Figure 2B:
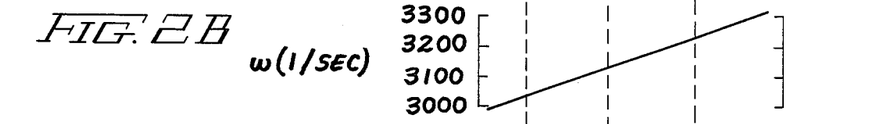
Figure 2C:
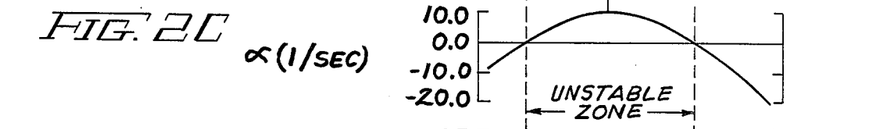
Figure 2D:
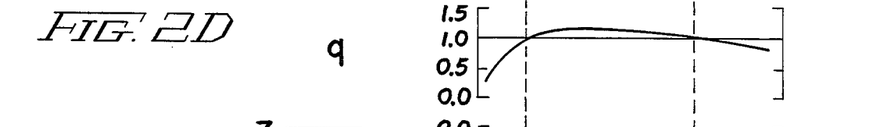
Figure 2E:
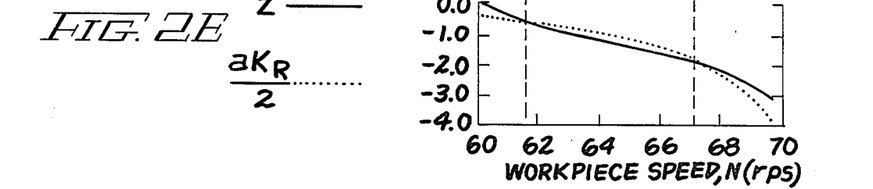

FIGS. 1 and 2A-E illustrate the typical response of a singly regenerative system as a function of workpiece rotational speed, FIG. 1 illustrating the exponential growth index for $n = 3-16$ lobes, and FIGS. 2A-E indicating the variation in regenerative parameters for eight lobes. These figures describe a particular machine characterized by the following coefficients:

$A = 8.98$ $$c_o/2m = 125.0 \text{ (1/sec)} \qquad (2)$$

$$2mK_R = 2.027 \times 10^{-6} \text{ (sec}^2\text{)}$$

where the above parameters are defined in Appendix A.

FIGS. 1 and 2A-E illustrate several important characteristics of singly regenerative instability. FIG. 1 shows that each number of lobes is associated with a region of instability (where the exponential growth index, $\alpha$, is greater than zero) and that, at least at the higher speeds, between adjacent unstable regions there is an operating speed range where the system is stable. As speed is increased, the number of lobes associated with each unstable region decreases and the unstable regions grow wider, but at the same time there is a greater range of speeds between unstable regions where the system is stable. Conversely, as speed decreases, more lobes are generated and the plots of $\alpha$ for adjacent lobe numbers overlap at larger and larger values of $\alpha$. This continues until the overlap is above the coordinate axis of FIG. 1, which for the particular machine illustrated occurs at a speed of approximately 41 rps. The system is unconditionally unstable at all speeds below this point. The spindle speed times the number of lobes is approximately equal to the machine resonant frequency.

For a given number of lobes, the figures show that the maximum value of $\alpha$ occurs at the center of the unstable region. Similarly, the most stable conditions occur at the center of the stable regions between adjacent peaks of $\alpha$. From FIGS. 2A and C, it can be seen that the lobe precession angle per revolution corresponding to the peak instability occurs at a value of approximately $\pi/2$ radians, and that there is a range of values of lobe precession angle about this value at which the system is unstable. The unstable zone is shown in FIGS. 2A-E as the region between the two vertical dotted lines at workpiece speeds of approximately 61.5 and 67 rps.

As noted above, there are six important parameters that govern regenerative chatter, three of which are related to the machine tools itself, i.e., m, c, and $k_s$, and three of which characterize the machine process, i.e., T, $K_w$, and $\mu$. The parameters m, c, and $k_s$ describe a simple damped single-degree of freedom mechanical system. If they are determined for the fundamental or first resonant machine mode, they generally characterize the machine's most chatter-prone condition. These parameters may be determined in a number of different well-known ways from a dynamic analysis of the machine tool. For example, an electrodynamic shaker may be employed to drive the workpiece with a constant drive force over a variable frequency range of 30 to 1000 Hz, where the main chatter information is located, and the acceleration of the workpiece may be measured and recorded as a function of frequency. The result gives the system resonant frequencies and responses. The mass, m, damping, c, and stiffness, $k_s$, can be expressed in terms of the shake test results as:

$$m = \left[ \frac{k_3^2 - k_3^2}{(\omega_3^2 + \omega_1^2 - 2\omega_n^2)(\omega_3^2 - \omega_1^2)} \right]^{\frac{1}{8}} \quad (3)$$

$$k_s = [k_n^2 + m^2\omega_n^4]^{\frac{1}{2}} \quad (4)$$

$$c = [2mk_s - 2m^2\omega_n]^{\frac{1}{2}} \quad (5)$$

where $k_1$ and $k_3$ are dynamic stiffnesses (force/deflection) at the drive frequencies $\omega_1$ and $\omega_3$, and $k_n$ is measured at the resonant frequency $\omega_n$ ($\omega_1 < \omega_n < \omega_3$). The stiffness $k_1$ and $k_3$ are generally measured at the $\frac{1}{2}$-power points below and above the resonant peak, $\omega_n$. The machine's response or deflection is at its maximum for a given drive force at resonance; thus, $K_n$ is the minimum dynamic stiffness. For a undamped system, $k_n = 0$.
The values of dynamic stiffness in terms of measured values are given as $$k_i = F_i \omega_i^2 / |\ddot{x}_i| \quad (6)$$

where $F_i$, $\omega_i$, and $|\ddot{x}_i|$ are the force, frequency, and acceleration magnitudes, respectively, at a given drive frequency. While the shake test may be employed to determine $k_s$, it is preferable to determine this parameter by using a load cell and screw jack to load the workpiece against the tool holder, and to employ a dial gauge to measure the deflection as a function of load. From these tests, a curve of force vs. deflection may be plotted, and $k_s$ may be determined as the slope of a linear portion of the resulting curve.

Figure 6:
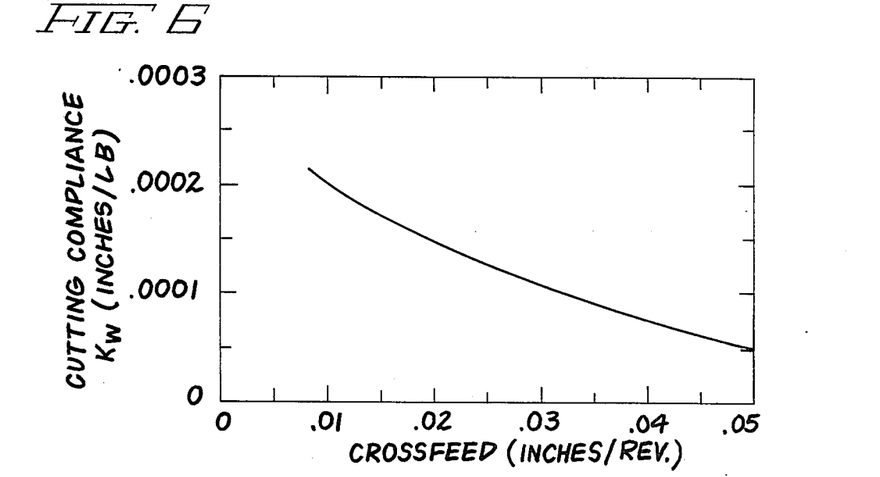
FIG. 6 is a plot illustrating the relationship between cutting compliance and crossfeed for the machining operation of FIG. 3.

With respect to the cutting process parameters, the workpiece rotational period, T, is readily determined from the rotational speed of the spindle. The cutting compliance, $K_w$, is the differential depth-of-cut per unit differential normal cutting force. It may be determined by choosing a particular feed rate and then running a plurality of cuts at different depths-of-cut. The normal cutting force may be determined for each depth-of-cut, and the cutting compliance subsequently calculated by determining the change in depth-of-cut per unit cutting force. This may be accomplished by taking the ratio of the depth-of-cut to force for each of the tests and averaging the results. Preferably, this is repeated for a number of different crossfeeds in order to plot a curve of cutting compliance vs. crossfeed, such as shown in FIG. 6.

The final parameter needed to analyze chatter is the overlap factor, $\mu$. The overlap factor is a measure of regenerative feedback. It is the ratio of the regenerated to the total chip width. If $\mu = 1$, there is total overlap and the full width of cut contributes to regenerative feedback. This is typical of parting or plunge facing the end of a pipe. If $\mu = 0$, there is no overlap, and feedback and regenerative chatter are impossible. This situation is typical of thread cutting. For a button-type cutting insert, the overlap factor may be approximated by the equation $$\mu = (\sqrt{Dd - d^2} - f)/\sqrt{Dd - d^2} \quad (7)$$

where D is the button diameter, d is the depth-of-cut, and f is the feed per revolution.

Once the machine and process-related parameters have been determined for a particular machining process, the equations of Appendix A may be employed for analyzing the machining process. A given number of lobes or workpiece waves may be first specified, and the equations characterizing regenerative stability employed for determining parameters such as the exponential growth index and the lobe precession per revolution as a function of workpiece or spindle rotation speed. The number of lobes to be analyzed must be chosen so that the resultant calculated spindle speed falls within the correct spindle speed range for the machine under consideration. This may be done by noting the chatter frequency. Since the chatter frequency, f, is approximately $$f = (\tfrac{1}{2}\pi) \sqrt{k_s/m} \quad (8)$$

and since the number of lobes times the spindle speed closely approximates the chatter frequency, the number of lobes to be analyzed can be estimated as the ratio of the chatter frequency to the spindle speed.

As may be appreciated, a machining process is a dynamic one in which the cutting process parameters are functions of a number of different variables. Thus, it is not possible to establish fixed machining conditions which will ensure stability and optimum productivity. Rather, it is necessary to monitor continually the stability of the process and adaptively control processing conditions so as to afford both stable operation and optimum productivity. The curves of FIGS. 1 and 2A-E indicate that lobe precession is a good measure of the stability of the machining process. What is needed is a way of determining in real time the lobe precession effect so that the stability of the process may be monitored, and a way of adaptively controlling the process in response to changing conditions to maintain stability and, preferably, optimize productivity. The invention satisfies these needs by providing both a method and an apparatus for monitoring and controlling a single point machining operation which accomplish the desired objectives.

The curves of FIGS. 1 and 2A–E imply that spindle speed may be controlled to maintain the machining process in a stable operating zone. The difficulty with this control approach is that the cutting speed of currently available machines is limited by tool material which requires spindle speeds which are substantially less than the speeds indicated in FIGS. 1 and 2A–E. For example, a cutting speed of the order of 100 SFPM (Surface Feet Per Minute) and a workpiece diameter of the order of 4–6 inches correspond to a spindle speed of the order of 1 rps. For typical values of $k_s$ and m of currently available machines, the chatter frequency given by equation (8) may be of the order of 60 Hz. At a spindle speed of 1 rps, the resulting chatter would correspond to 60 workpiece lobes.

Figure 3:
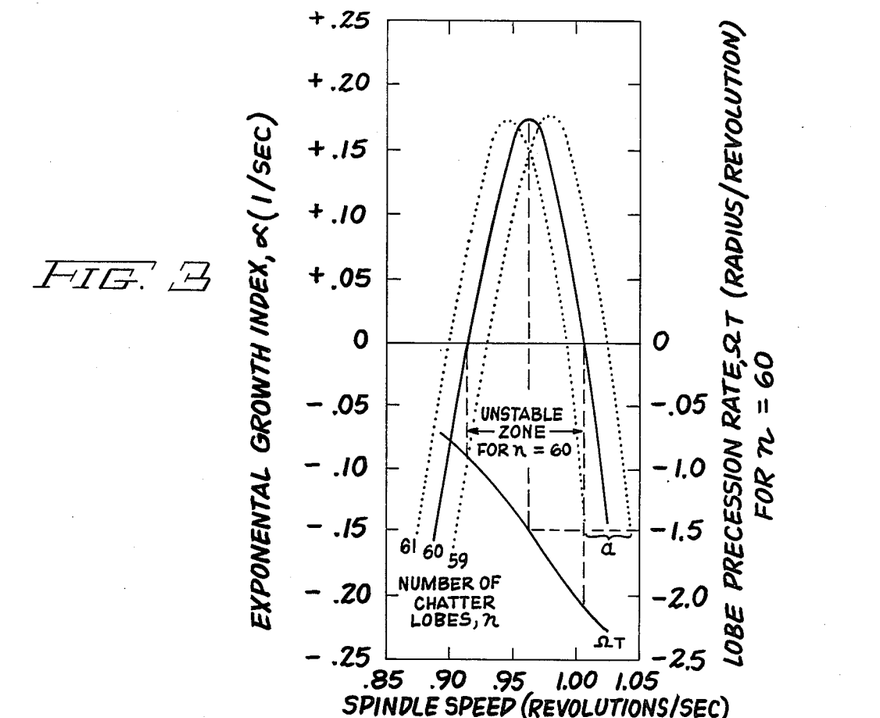
FIG. 3 illustrates the variation in exponential growth index and lobe precession rate with workpiece spindle speed for another machining operation and for 60 workpiece lobes.

FIG. 3 illustrates exponential growth index and chatter lobe precession rate as a function of spindle speed for speeds of the order of 1 rps and 60 lobes with an overlap factor of 1. FIG. 3 resulted from a dynamic analysis of a 30-hp Mazak slant turn lathe machining Inconel 718 with a 883 grade tungsten carbide button insert. This lathe is typical of currently available machines. Following the procedures outlined above, the machine and process-related parameters were determined from a dynamic analysis of the machining operation. The resulting values of $k_s$ and m give a chatter frequency, from equation (8), of 60 Hz.

As previously pointed out in connection with FIG. 1, as spindle speed is decreased and a larger number of lobes are generated on the workpiece, the curves of exponential growth index for adjacent lobes begin to overlap above the coordinate axis and the system becomes unconditionally unstable. FIG. 3 indicates (in dotted lines) the exponential growth index curves for 59 and 61 lobes, and clearly illustrates this overlapping. As shown, the three curves of exponential growth index intersect above the coordinate axis at values greater than zero. Accordingly, changing spindle speed in this speed range would have no effect on the unstable state of the machining operation, since upon moving away from a peak associated with 60 lobes an instability associated with either 59 or 61 lobes would be immediately encountered. Thus, at the operating speeds of currently available machines, stability cannot be controlled by controlling spindle speed. If, however, machines were capable of much higher speeds where only a few lobes would be generated and where there are stable zones between instabilities, chatter could be controlled by controlling spindle speed. Accordingly, in the current state of affairs, another control technique is required. This invention provides such a technique, as will be described shortly. First, however, an apparatus for monitoring and controlling the machining operation will be described.

Figure 4:
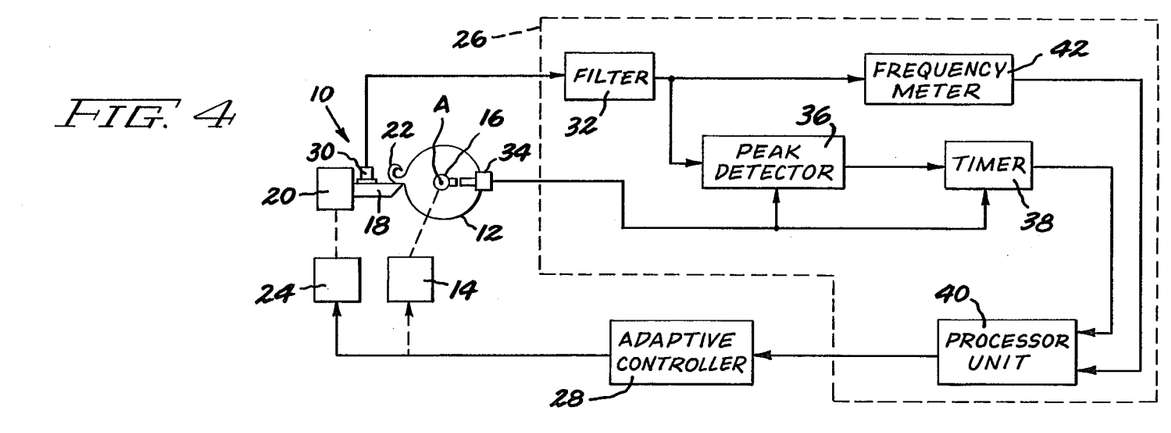
FIG. 4 is a block diagram of apparatus in accordance with the invention for monitoring and controlling the stability of a single point machining operation.

FIG. 4 illustrates in block diagram form an apparatus in accordance with the invention for optimizing a single point machining operation 10. As illustrated schematically in the figure, the machining operation, which may comprise a lathe, may rotate a workpiece 12 about an axis A of the workpiece by means of a drive mechanism 14. As is conventional with a lathe, the workpiece may be connected to a spindle 16 which is rotatably driven by a drive motor which is part of the drive mechanism. A cutting tool 18 may be secured to a force-applying device 20 which is arranged to move the cutting tool into engagement with the rotating workpiece so as to cause the cutting tool to remove a chip 22 of material from the workpiece. The cutting tool and force-applying device may be connected to a crossfeed drive mechanism 24 which enables the cutting tool and force-applying means to be moved relative to the workpiece in a direction parallel to the rotational axis A. As is conventional, the crossfeed drive mechanism 24 is constructed so as to enable the feed rate to be varied over a preselected range of values, and drive mechanism 14 may be constructed to enable the rotational speed of the workpiece to be varied over another preselected range of values. The crossfeed drive mechanism 24 may be synchronized to the drive mechanism 14 so as to enable the cutting tool to be moved a predetermined number of inches (or fraction of an inch) parallel to axis A for each revolution of the workpiece.

In accordance with the invention, a stability detector 26 is provided for monitoring the stability of the machining operation on the basis of the lobe precession effect. The stability detector determines the lobe precession angle per revolution, $\Omega T$, on each revolution of the workpiece and supplies the values of lobe precession to an adaptive controller 28, where they are used in an adaptive control strategy to produce appropriate control signals which are fed back to the machining operation for controlling the machining conditions to maintain it in a stable state.

As shown in FIG. 4, stability detector 26 may comprise a vibration sensor 30, such as an accelerometer and a pre-amplifier, which may be secured to the cutting tool 18 for sensing the vibrations produced during the machining operation and for outputting a corresponding vibrational signal. The raw vibrational signal from the vibration sensor may be filtered by a filter 32 to provide a filtered signal corresponding to the cutting vibrations in a desired frequency range. Filter 32 may comprise, for example, a low pass filter having its cut-off frequency selected to be approximately equal to the chatter frequency. In order to determine the lobe precession angle, it is necessary to measure the changing phase of the cutting vibrations relative to the workpiece. This may be accomplished by measuring the change in angle of a predetermined magnitude of the filtered vibrational signal relative to a predetermined rotational position of the workpiece over successive revolutions of the workpiece. In order to reference the vibrational signal to the workpiece, a tachometer generator 34 may be coupled to the drive spindle of the workpiece and arranged to output a single pulse for each revolution of the workpiece upon the workpiece attaining a predetermined angular position. The filtered vibrational signal and the tachometer pulses may be supplied to a peak detector 36 which is triggered by the tachometer pulses to detect the peak magnitude of the vibrational signal between the successive pulses and to output a signal upon the vibrational signal reaching its peak value. The signal from the peak detector and the tachometer pulses may be supplied to a timer 38 which measures the time interval between each tachometer pulse and the peak detect signal from the peak detector. The timer supplies this time information to a processor unit 40 which may comprise a microprocessor. The filtered vibrational signal from filter 32 may also be supplied to a frequency meter 42 which measures the frequency of the vibrational signal and which outputs to the processor unit, preferably in digital form, a signal representative of the measured frequency. The frequency meter may be a conventional frequency counter, and may be triggered by the tachometer pulses to measure the average frequency of the vibrational signal during each revolution of the workpiece.

The processor unit utilizes the frequency information and the time information to determine the lobe precession angle per revolution, $\Omega T$, and outputs the determined values of lobe precession to the adaptive controller 28, which produces real time control signals for controlling the machining operation.

Figures 5A, 5B:
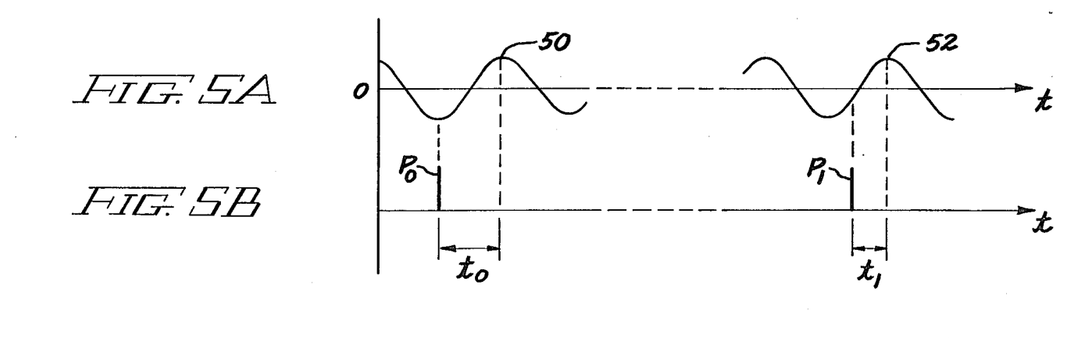
FIGS. 5A-B are a timing diagram useful for explaining the operation of the apparatus of FIG. 4.

FIGS. 5A and B constitute a timing diagram which is useful for illustrating the manner in which the lobe precession angle per revolution may be determined by the processor unit.

FIG. 5A illustrates the filtered vibrational signal from filter 32, and FIG. 5B illustrates two consecutive tachometer pulses $P_0$ and $P_1$ in an assumed time relationship with the vibrational signal of FIG. 5A. The lobe precession angle per revolution is the angle by which the lobes on the workpiece change their positions relative to the workpiece over one revolution, as previously noted. This angle is the same as the angle by which the phase of the vibrational signal changes over one revolution, which may be determined by measuring the change in angle of a predetermined magnitude of the vibrational signal, such as its peak, relative to two consecutive tachometer pulses.

For the assumed relationship between the vibrational signal and the tachometer pulses illustrated in FIGS. 5A and B, the angle in radians between a peak 50 of the vibrational signal and tachometer pulse $P_0$ is $$\theta_0 = \omega t_0 = 2\pi f t_0 \qquad (9)$$

where f is the chatter frequency measured by frequency meter 42, and $t_0$ is the time interval between peak 50 and pulse $P_0$. Similarly, on the next revolution of the workpiece the angle in radians between peak 52 of the vibrational signal and pulse $P_1$ is $$\theta_1 = \omega t_1 = 2\pi f t_1 \qquad (10)$$

where $t_1$ is the time interval between peak 52 and pulse $P_1$. Thus, the lobe precession angle per revolution, which must be negative, is $$\Omega T = \theta_1 - \theta_0 \text{ when } \theta_1 < \theta_0 \qquad (11)$$

or $$\Omega T = \theta_1 - \theta_0 - 2\pi, \text{ when } \theta_1 > \theta_0 \qquad (12)$$

If a different relative peak is sensed on two consecutive revolutions, the value of $\Omega T$ will be greater than 0, in which case it is necessary to subtract one complete cycle ($2\pi$ radians) as indicated by equation (12) to move the reference back to the correct relative peak.

Thus, from equations (9)-(12), the lobe precession angle per revolution is equal to $$\Omega T = 2\pi[f(t_1 - t_0)], \text{ if } t_1 < t_0 \qquad (13)$$

$$\Omega T = 2\pi[f(t_1 - t_0) - 1], \text{ if } t_1 > t_0 \qquad (14)$$

Processor unit 40 performs the logic indicated in equations (13) and (14). It receives consecutive time intervals $t_0$ and $t_1$ measured by the timer 38 and the frequency f measured by frequency meter 42, subtracts $t_0$ from $t_1$, and multiplies the result by the frequency f. If this quantity is less than zero, it is multiplied by $2\pi$ and the result is output as the lobe precession value. If the quantity is greater than zero, 1 is first subtracted and the result is multiplied by $2\pi$ and output as the lobe precession value.

As noted above, the lobe precession values from processor unit 40 are utilized by adaptive controller 28 in an adaptive control strategy to generate signals which are fed back to the machining operation to control the machining conditions. These control signals preferably control the crossfeed drive 24 so as to control the relative movement between the tool and the workpiece in a direction parallel to the axis of rotation, for reasons which will be described. In an appropriate case where the rotational speed of the workpiece is sufficiently great so that few workpiece lobes are generated and there exist stable areas between lobes, such as shown in FIG. 1, the control signals may be employed for controlling the workpiece drive mechanism 14 to control the workpiece rotational speed.

In adaptive controller 28, the measured value of lobe precession from processor unit 40 is compared to a predetermined range of values within which regenerative chatter may occur. When the lobe precession value falls within the predetermined range of values, the control signals to the crossfeed drive mechanism reduce the crossfeed rate until the lobe precession value from the processor unit falls outside of the predetermined range of values. This may be accomplished by successively reducing the crossfeed rate by preselected increments until the measured value of lobe precession falls outside of the predetermined range. The incremental reduction in crossfeed rate may be fixed or it may be variable, depending, for example, on the magnitude of the lobe precession value. The predetermined range of values may be selected so as to afford a desired degree of confidence that the system will be stable when it is operated so that the lobe precession value is outside of the range. Optimum productivity can be obtained by controlling the crossfeed so as to maintain the lobe precession at a value just outside of but close to the predetermined range of values since this maximizes the rate at which material is removed from the workpiece while maintaining the system in a stable operating state.

As pointed out above, with currently available machines where cutting speed is limited by the tool material, as, for example, to 100 SFPM, the workpiece speed is in a range where a large number of lobes are generated and the exponential growth index curves of adjacent lobes overlap above the coordinate axis, rendering the system unconditionally unstable. In order to stabilize such a system, it is necessary to control the machining conditions so as to move the lobes down to at least a point where the overlap between adjacent lobes falls below the coordinate axis, and preferably to the point where the peak of the exponential growth index curve falls on the coordinate axis. It has been found that this may be accomplished by increasing the cutting compliance, $K_w$, which may be done by controlling the movement of the cutting tool relative to the workpiece, and more particularly by decreasing the crossfeed. As the crossfeed decreases, the regenerative stiffness of a cut decreases and the cutting compliance increases, causing the system to become more compliant and, therefore, more stable. The relationship between crossfeed and cutting compliance is illustrated in FIG. 6. This curve was obtained in the manner previously described from the dynamic analysis of the Mazak lathe machining Inconel 718 with a ½ inch button insert at 100 SFPM. The relationship illustrated in FIG. 6 is typical of single point machining operations, although the particular values shown in the figure are for this particular machining operation and will vary with different machines and different cutting conditions.

The effect on stability of changing cutting compliance can best be described by reference to the curves of FIGS. 2 and 3. Although FIGS. 2 and 3 are for different machining operations and for a different number of lobes (FIG. 2 being for 8 lobes and FIG. 3 being for 60 lobes), in both cases the peak of the exponential growth index, $\alpha$, occurs at a value of lobe precession, $\Omega T$, of approximately $-1.5$, which corresponds to the peak instability of the system where the phase change between the lobe positions on successive revolutions is approximately $\pi/2$. As previously explained, the figures show that there is a range of lobe precession values about the value corresponding to maximum instability within which the system is unstable. This range of values corresponds to the zero axis crossings of the exponential growth index curve and is indicated by the dashed vertical lines in the figures. For the conditions illustrated in FIG. 2, the range of lobe precession values within which the system is unstable is approximately $-1.0$ to $-2.0$, and in FIG. 3 the range of values is about the same, between approximately $-0.9$ and $-2.1$. The effect of increasing the cutting compliance is to move the exponential growth index curve downwardly so that the peak value of $\alpha$ approaches the zero axis. This causes the zero axis crossings of $\Omega T$ to change and to move toward one another decreasing the width of the unstable zone as the dashed vertical lines move toward one another. This produces a corresponding decrease in lobe precession values at which the system is unstable. When the curve has moved downwardly to the point at which its peak coincides with the zero axis, the lobe precession is at its value corresponding to maximum instability (approximately $-1.5$). The value of cutting compliance at which this occurs may be determined from the equations of Appendix A and related to a predetermined crossfeed from a curve such as FIG. 6.

The implications of the foregoing for adaptive control of the machining process should now be apparent. By using the machine dynamic parameters for different cutting locations on the workpiece and the equations of Appendix A, the values of cutting compliance needed to put the peak of the $\alpha$ vs. workpiece speed curves at zero for each workpiece location and for the appropriate number of lobes may be determined. Next, the approximate crossfeeds needed to produce the required values of cutting compliance can be estimated from curves such as illustrated in FIG. 6, and the corresponding values of lobe precession determined. These values of crossfeed may be used as starting points for adaptive control of the machining operation, and a predetermined range of values of lobe precession about the value corresponding to maximum instability may be defined. During a machining operation, adaptive controller 28 receives on each revolution of the workpiece the measured value of lobe precession from processor unit 40, and may compare the measured value with the predetermined range of values. If the measured value falls within the predetermined range, the adaptive controller may output appropriate control signals to crossfeed drive mechanism 24 to reduce the crossfeed until the measured value of lobe precession falls outside of the predetermined range. Maintaining the lobe precession value outside of this range will insure that the machining system remains within a stable operating state.

For control purposes, the selected range of lobe precession values may be between approximately $-1.0$ and $-2.0$ rad/rev. Although this is a safe operating range, it is not the most efficient in terms of productivity. Accordingly, in order to optimize productivity, it is desirable to employ a narrower range of values about the value of lobe precession corresponding to maximum instability, (approximately $-1.5$) and to control the crossfeed at each point along a cut so as to maintain the measured value of lobe precession just outside of the selected range. For example, the range of lobe precession values may be selected to be between approximately $-1.4$ and $-1.6$ rad/rev.

As previously noted, upon detecting a measured lobe precession value within the predetermined range, the adaptive controller may successively decrease the crossfeed in preselected increments until the value of lobe precession falls outside of the predetermined range. Thereafter, the crossfeed may be increased by another preselected increment until the lobe precession reaches a value which is just shy of chatter. This will insure that optimum machining conditions are maintained.

Where the machining conditions are such that high workpiece rotational speeds may be employed so that only a few lobes are generated on the workpiece and there are stable operating areas between zones of instability, such as illustrated in FIG. 1, stable operation may be achieved by controlling workpiece speed so as to maintain the lobe precession at a value which is within a stable zone. In this case, the range of lobe precession values may be selected, based upon curves such as shown in FIG. 2, to be between approximately $-1.0$ and $-2.0$ rad/rev., and stability maintained by decreasing workpiece speed for measured values of lobe precession between $-1.0$ and $-1.5$ rad/rev., and by increasing workpiece speed for measured values of lobe precession between $-1.5$ and $-2.0$ rad/rev.

Adaptive controller 28 may comprise any conventional machine controller capable of comparing an input signal to preselected limits and producing an appropriate output control signal. If desired, the adaptive controller functions may be incorporated within the processor unit 40.

While a preferred embodiment of the invention has been shown and described, it will be apparent to those skilled in the art that changes can be made in this embodiment without departing from the principles and spirit of the invention, the scope of which is defined in the appended claims.

APPENDIX A

Equations Characterizing Single Point Machining

Regenerative Stability $$\beta^2 = \frac{1}{2mK_{Rq}} \left[ -\left(Aq + \frac{2z^2}{z^2+1}\right) + \right. \tag{A1}$$

-continued $$\omega^2 = \frac{1}{2mK_Rq}\left[ + \left(Aq + \frac{2z^2}{z^2+1}\right) + \sqrt{\left(Aq + \frac{2z^2}{z^2+1}\right)^2 + \frac{4z^2}{(z^2+1)^2}} \right] \quad (A2)$$

$$\sqrt{\left(Aq + \frac{2z^2}{z^2+1}\right)^2 + \frac{4z^2}{(z^2+1)^2}}$$

$$q = 1 + \frac{\sinh \alpha T}{\cosh \alpha T - \cos \omega T} \quad (A3)$$

$$z = \frac{e^{\alpha T} - \cos \omega T}{\sin \omega T} \quad (A4)$$

$$\omega = 2\pi nN + \Omega \quad (A5)$$

$$\Omega T = \psi + \cos^{-1}\left[\frac{e^{2n\pi\alpha/\omega}}{\sqrt{z^2+1}} \cdot e^{(\alpha/\omega)\cdot\Omega T}\right] \quad (A6)$$

Where:

$a = F_0/L$, cutting stability index (N/m)
$A = K_R(k_0 - c_0^2/4m)$, machine stiffness parameter (N/m)
$c_0$ = measured, known system damping (N−s/m)
$e$ = 2.71828, natural logarithm base
$F_0$ = initial force or noise in the system (N)
$k$ = actual machine/workpiece stiffness (N/m)
$k_0$ = effective dynamic system stiffness = $k + 1/K_w(1-\mu)$
$K$ = apparent regenerative cutting compliance (m/N)
$K_R$ = actual regenerative cutting compliance = $k_w/\mu (m/N)$
$K_w$ = actual total cutting compliance (m/N)
$L$ = lobe amplitude (m)
$m$ = equivalent machine mass (N−s²/m)
$n$ = integer number of lobes or surface undulations
$N$ = workpiece rotational speed (rev/s)
$q = K/K_R$, compliance quotient
$t$ = time (s)
$T = 1/N$, period or workpiece rotation (s)
$z = aK/2$, dimensionless cutting stability index
$\alpha$ = exponential growth index (1/s)
$\beta = \alpha + c_0/2m$, reduced stability (1/s)
$\mu$ = overlap factor
$\psi = \tan^{-1} z$
$\omega$ = frequency of regenerative vibrations (rad/s)
$\Omega$ = lobe precession rate (rad/s)

The dimensional units of each term are indicated in parenthesis.

APPENDIX B
Computer Program For Performing The Steps
Of A General Stability Analysis

```
0010        DO 100 N=1,16
0011        PRINT,N
0012        C1=9.0
0014        C2=0.02
0016        C3=0.000002027
0018        C4=125.0
0020        J=1
0030    5   Q=1.3
0040        X=-0.1*J
0050        Y=X*X+1.
0060        UK=-2.*X*X/Y
0070        VK=-2.*X/Y
0080   10   AK=Q*(C1-C2)
0090        UK1=AK-UK
0100        RAD=SQRT(UK1*UK1+VK*VK)
0110        B=SQRT((RAD-UK1)/(C3*Q))
0120        A=B-C4
0130        W=SQRT((RAD+UK1)/(C3*Q))
0140        PHI=ATAN(X)
0150        PI=4.*ATAN(1.)
0160        E=EXP(2.*N*PI*A/W)
0170        F=E/SQRT(Y)
0180        THETA1=ARCOS(F)
0190        OT1=PHI-THETA1
0200   20   THETA2=ARCOS(F*EXP(OT1*A/W))
0210        OT2=PHI-THETA2
0220        IF (ABS(OT1-OT2)-.0000001)60,60,40
0230   40   OT1=OT2
0240        GO TO 20
0250   60   WT=2.*N*PI+OT2
0260        AT=WT*A/W
0270        QR=2.*(EXP(AT)-COS(WT))/(EXP(AT)+EXP(-AT)-2.*COS(WT))
0290        IF (ABS(QR-Q)-.00005)80,80,70
0293   70   Q=(9.*Q+QR)/10.
0295        GO TO 10
0300   80   RPS=W/WT
0310        PRINT,RPS,A,W
0320        PRINT,OT2,Q,X
0325        PRINT,AT,WT,QR
0327        PRINT," "
0330        IF (J-31.0)90,100,100
0340   90   J=J+1.0
0350        GO TO 5
```

-continued

APPENDIX B
Computer Program For Performing The Steps
Of A General Stability Analysis

| 0360 | 100 | CONTINUE |
| 0370 | | STOP |
| 0380 | | END |

In the program, the constants C1–C4 on lines 0012–0018 correspond to the numerical values of:

| C1: | $K_R k$ | C3: | $2mK_R$ |
| C2: | $K_R c_o^2/4m$ | C4: | $c_o/2m$ |

I claim:

1. A method of optimizing a single point machining operation wherein a cutting tool engages a workpiece which is rotated about an axis thereof and the tool and workpiece are moved relative to one another to machine the workpiece, the method comprising sensing vibrations produced by said machining operation; converting the vibrations to a corresponding electrical signal; measuring, over successive revolutions of the workpiece, a change in angle relative to the workpiece at which said electrical signal reaches a predetermined magnitude; and controlling the relative movement between the workpiece and the tool so as to maintain said change in angle outside of a predetermined range of values; wherein said measuring comprises measuring a time interval between the workpiece reaching a predetermined angular position and the time of occurrence of said predetermined magnitude; determining a time difference between the time intervals measured on the successive revolutions of the workpiece; measuring a frequency of said electrical signal; and determining said change in angle using said measured frequency and said time difference.

2. The method of claim 1, wherein said measuring of said time interval comprises producing, in each revolution, a pulse upon the workpiece reaching said predetermined angular position, and measuring the time between said pulse and a peak of the electrical signal, said peak being said predetermined magnitude.

3. The method of claim 1, wherein said controlling comprises controlling a crossfeed rate at which the tool and workpiece move relative to one another in a direction parallel to the axis of rotation of the workpiece.

4. The method of claim 3, wherein said controlling comprises reducing the crossfeed rate when said change in angle is within said predetermined range of values.

5. The method of claim 4, wherein said controlling comprises adjusting the crossfeed rate, when said change in angle is outside of said predetermined range of values to provide an angle value which is close to said range of predetermined values to optimize productivity.

6. Apparatus for optimizing a single point machining operation wherein a cutting tool engages a workpiece which is rotated about an axis thereof and the tool and the workpiece are moved relative to one another to machine the workpiece, the apparatus comprising means for determining a lobe precession angle per revolution representative of the precession of lobes about the workpiece due to chatter at relatively low rotational speeds where more than a few lobes are generated; means for comparing the lobe precession angle to a predetermined range of values within which regenerative instability of the machining operation may occur; and means for controlling a crossfeed rate at which the tool and the workpiece are relatively moved in a direction parallel to the axis of rotation so as to maintain the lobe precession angle outside of said predetermined range of values; wherein said determining means comprises means for sensing vibrations produced by said machining operation and for producing a corresponding first electrical signal; means for producing, on each revolution of the workpiece, a second electrical signal upon the workpiece reaching a predetermined angular position; means for measuring, on each revolution, a time interval between said second electrical signal and a predetermined magnitude of said first electrical signal; means for measuring a frequency of the first electrical signal; and means for determining said change in angular position of the lobes using the measured frequency of the first electrical signal and a change in measured time intervals between said second electrical signal and said predetermined magnitude of said first electrical signal over successive revolutions of the workpiece.

7. The apparatus of claim 6 wherein said predetermined magnitude comprises a peak magnitude of said first electrical signal.

8. The apparatus of claim 6, wherein said controlling means comprises means for reducing the crossfeed rate when said lobe precession value is within said predetermined range of values.

9. The apparatus of claim 8, wherein said controlling means comprises means for maintaining the crossfeed rate at a value close to but outside of said predetermined range of values.

* * * * *